United States Patent
Smith et al.

(10) Patent No.: US 9,607,220 B1
(45) Date of Patent: Mar. 28, 2017

(54) IMAGE-BASED VEHICLE SPEED ESTIMATION

(71) Applicants: Shawn B. Smith, Portola Valley, CA (US); Dihn Tien Son, TPHCM (VN)

(72) Inventors: Shawn B. Smith, Portola Valley, CA (US); Dihn Tien Son, TPHCM (VN)

(73) Assignee: VaaS, Inc., Fort Worth, TX (US)

( * ) Notice: Subject to any disclaimer, the term of this patent is extended or adjusted under 35 U.S.C. 154(b) by 80 days.

(21) Appl. No.: 14/592,720

(22) Filed: Jan. 8, 2015

(51) Int. Cl.
  *G06K 9/00* (2006.01)
  *G06T 7/20* (2017.01)
  *G06K 9/32* (2006.01)

(52) U.S. Cl.
  CPC ......... *G06K 9/00624* (2013.01); *G06K 9/325* (2013.01); *G06T 7/20* (2013.01)

(58) Field of Classification Search
  None
  See application file for complete search history.

(56) References Cited

U.S. PATENT DOCUMENTS

| 2011/0267460 A1* | 11/2011 | Wang | G06T 7/20 348/135 |
| 2013/0229517 A1* | 9/2013 | Kozitsky | H04N 7/18 348/148 |

\* cited by examiner

*Primary Examiner* — Hadi Akhavannik
(74) *Attorney, Agent, or Firm* — Spano Law Group; Joseph S. Spano

(57) ABSTRACT

Methods and systems for estimating the speed of passing vehicles based on License Plate Recognition (LPR) image information are described herein. The distance traversed by a vehicle between image frames is estimated based on a difference between a pixel location of a tracking point on the vehicle in a first image and a second pixel location of the tracking point in second image of the vehicle. In some embodiments, the displacement identified in the images is converted to a projected displacement on the roadway surface based on the mapping between pixel locations within the field of view of the image sensor and locations on the surface of the roadway. The projected displacement is corrected by accounting for the difference in height of the camera module and tracking point over the roadway surface. An estimate of vehicle speed is calculated from the corrected displacement and the elapsed time between image frames.

21 Claims, 9 Drawing Sheets

150

| FRAME # | $(X_C, Y_C)$ [PIXELS] | $(X_R, Y_R)$ [METERS] | $L_P$ [M] | $L_V$ [M] | $S_V$ [M/S] |
|---|---|---|---|---|---|
| 1 | 1200, 200 | 0.45, 0.1 | — | — | — |
| 2 | 1210, 700 | 0.45, 1.6 | 1.5 | 1.4 | 42 |
| 3 | 1220, 1080 | 0.45, 3.1 | 1.5 | 1.4 | 42 |
| 4 | 1230, 1430 | 0.45, 4.7 | 1.6 | 1.5 | 45 |

$S_{AVG} = 43$ M/SEC

FIG. 6

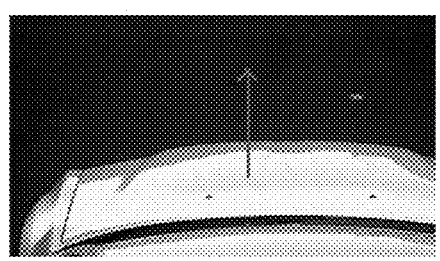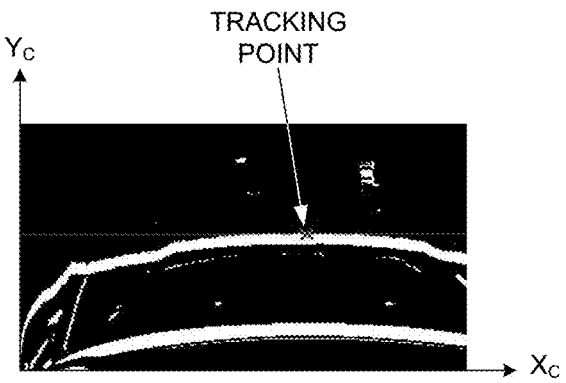
FIG. 7A      FIG. 7B
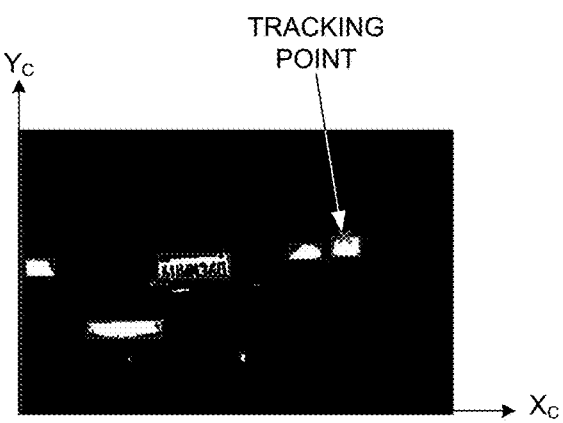
FIG. 8A      FIG. 8B

IMAGE-BASED VEHICLE SPEED ESTIMATION

TECHNICAL FIELD

The described embodiments relate to License Plate Recognition (LPR) systems and analysis of image data gathered by LPR systems.

BACKGROUND INFORMATION

License Plate Recognition (LPR) systems are typically employed to scan and log license plate information associated with vehicles in publically accessible areas. A typical LPR unit performs image analysis on captured images to identify the license plate number associated with each image. A typical LPR unit generates a record for each license plate number captured. The record may include any of an optical character recognition (OCR) interpretation of the captured license plate image (e.g., output in text string object format), images of the license plate number, a perspective image of the vehicle associated with the license plate number, the date and time of image capture, and the location of the LPR unit at the time of image capture. By continuing to operate each LPR unit for prolonged periods of time over a large area, the amount of aggregated LPR information grows. In addition, by combining the information generated by many LPR units, an LPR system may develop a large record of LPR information.

In one example, images captured by LPR systems at two different locations on a roadway may be analyzed to determine the average speed of a vehicle. Typically, two or more LPR systems are located a known distance apart on a particular roadway. Images captured by both systems are compared to identify image pairs associated with the same vehicle. An estimate of the average speed of the vehicle passing between the two LPR systems is computed based on the difference in time between capture of each of the pair of images and the known distance between the two different LPR systems used to capture each image.

Typically, the two LPR systems are physically separated by a relatively large distance (e.g., kilometers). Thus, the calculated average speed information may mask important details about the actual speed of the vehicle between the two LPR systems. In addition, images of the same vehicle captured by two different LPR systems must be identified to perform the estimation. Moreover, based on the aforementioned technique, two or more LPR systems installed at different locations are required to perform speed estimation.

Cost-effective improvements are desired to estimate vehicle speed based on LPR information.

SUMMARY

Methods and systems for estimating the speed of passing vehicles based on License Plate Recognition (LPR) image information are described herein. An estimate of vehicle speed is based at least in part by estimating the distance traversed by a passing vehicle during the time elapsed between image frames. The estimate of vehicle speed is based at least in part on a difference between a pixel location of a tracking point identified on the vehicle in a first image of the vehicle and a second pixel location of the tracking point in second image of the vehicle.

In one aspect, the estimate of the distance traversed by a passing vehicle during the time elapsed between image frames involves a look-up table or function that relates movements in camera coordinate space (i.e., an image based coordinate system) to physical movements over the surface of the roadway. In some embodiments, the relationship between movements in camera coordinate space and physical movements over the surface of the roadway is established based on a series of constant speed calibration passes. The vehicle speed at each calibration pass is known apriori. By monitoring the movements of the passing vehicle through each sequence of image frames associated with each different constant speed pass, the relationship between movements in camera coordinate space and physical movements over the surface of the roadway is established.

In a further aspect, a correction is made to the difference in pixel locations of a tracking point attached to images of a passing vehicle in two different image frames. The correction accounts for the distortion induced by attempting to capture the movement of a vehicle in three dimensional space by a two dimensional image sensor at a fixed location. In some embodiments, the correction is also established based on the series of constant speed calibration passes.

In another aspect, the estimate of the distance traversed by a passing vehicle during the time elapsed between image frames involves a mapping between pixel locations of captured images and locations on the roadway surface.

In one example, a calibration tarp having a set of evenly spaced gridlines is placed on the surface of a roadway within the field of view of the imaging system. An image of the calibration tarp is captured and analyzed to directly map pixel locations in a captured image to corresponding points on the calibration tarp. In this manner, a discrete number of points in a roadway coordinate space are directly mapped to a corresponding discrete number of points in a camera coordinate space.

In another example, the mapping may be generated analytically based on the geometric layout of the image sensor, associated optics, and the roadway surface. In this manner, a point-to-point mapping may be generated by simulation.

The displacement identified in camera coordinate space is converted to a projected displacement on the roadway surface based on the mapping between pixel locations within the field of view of the image sensor and locations on the surface of the roadway. The projected displacement on the roadway surface is divided by the time elapsed between the capture of the two images to arrive at an estimate of vehicle speed.

In a further aspect, the estimate of the distance traversed by a vehicle between image frames is improved by accounting for the difference in height of the camera module and the location point of the vehicle being tracked over the roadway surface. In this manner, the corrected estimate of the distance traversed by the vehicle is employed to estimate vehicle speed.

In yet another further aspect, one or more different cameras may be positioned to track vehicle movement and estimate vehicle speed in accordance with the methods and systems described herein. In some examples, an IR camera is employed to focus on license plates. Tracking points may be identified in the images captured by the IR camera and vehicle speed estimated based on the IR images. In some examples, a CCD camera is employed to capture images of the passing vehicle and vehicle speed is estimated based on the CCD images.

In yet another further aspect, the estimate of vehicle speed is based on two or more estimates of the distance traversed by a vehicle between three or more successive image frames. In one example, the vehicle speed is estimated as an average of the vehicle speeds associated with the displacement between each pair of image frames.

In a further aspect, each estimate of vehicle speed is evaluated to determine whether a significant error has occurred. In these examples, suspicious vehicle speed estimates are dropped from consideration, and the average speed is determined without including the erroneous values.

In yet another aspect, LPR based speed estimates are stored in an LPR database that is searchable, for example, based on any combination of license plate number, location, time period, and vehicle speed.

In one example, the LPR database is searchable by location and periods of time. In this manner, a distribution of the speeds of the passing vehicles on a particular roadway over a particular time period may be generated.

In another example, the LPR database is searchable by vehicle speed, for example, to identify locations and times when significant over speed may be occurring.

The foregoing is a summary and thus contains, by necessity, simplifications, generalizations, and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 6 depicts a table 150 illustrating the location, displacement, and speed estimation associated with movement of a tracking point between each of images 142A-D illustrated in FIG. 5.

FIGS. 7A and 7B depict an image of a passing vehicle from an elevated viewpoint.

FIGS. 8A and 8B depict an image of the back of a passing vehicle from an elevated viewpoint.

DETAILED DESCRIPTION

Reference will now be made in detail to background examples and some embodiments of the invention, examples of which are illustrated in the accompanying drawings.

Figure 1:
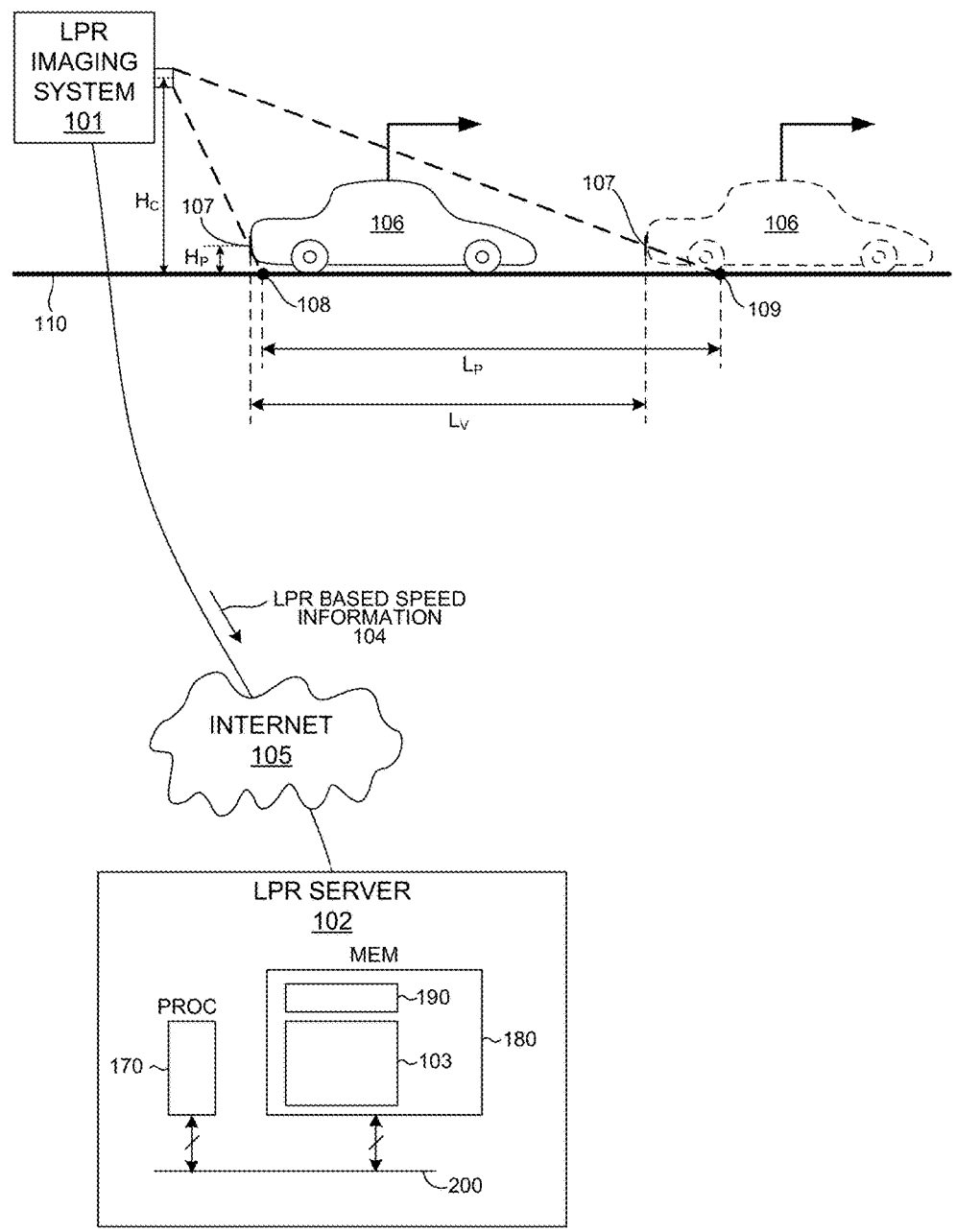
FIG. 1 is a diagram illustrative of a License Plate Recognition (LPR) system that includes an LPR imaging system 101 and an LPR server 102.

FIG. 1 is a diagram illustrative of a License Plate Recognition (LPR) system that includes an LPR imaging system 101 and an LPR server 102 that stores a database 103 of LPR based speed information 104 generated by one or more LPR imaging systems. As depicted in FIG. 1, an image sensor of LPR imaging system 101 is located in a fixed position with a view of passing vehicles (e.g., along a roadside, mounted to a traffic signal, etc.). As vehicles travel by the fixed position, LPR imaging system 101 captures a sequence of images of the passing vehicle. Based on an analysis of the captured images, LPR imaging system 101 estimates the speed of the passing vehicle. The estimate of speed of the passing vehicle is communicated from LPR imaging system 101 to LPR server 102 as part of LPR based speed information 104.

In some embodiments, the captured images include images of the vehicle license plate. These images are also analyzed to determine the license plate number of the passing vehicle. In some embodiments, the captured images include images of all, or part, of the passing vehicle. These images may be employed to identify or classify the vehicle. In these embodiments, any of the captured images, or analysis results (e.g., license plate number, vehicle identity or classification, etc.) may also be communicated to LPR server 102.

LPR server 102 includes a processor 170 and an amount of memory 180. Processor 170 and memory 180 may communicate over bus 200. Memory 180 includes an amount of memory 190 that stores a database program executable by processor 170. Exemplary, commercially available database programs include Oracle®, Microsoft SQL Server®, IBM DB2®, etc. Memory 180 also includes an amount of memory that stores an LPR database 103 of LPR based speed information 104 searchable by the database program executed by processor 170.

In the embodiment depicted in FIG. 1, LPR imaging system 101 is communicatively linked to LPR server 102 via the Internet 105. However, LPR imaging system 101 may be communicatively linked to LPR server 102 by any communication link known to those skilled in the art. For example, LPR imaging system 101 may be communicatively linked to LPR server 102 over a local area network (LAN), a wireless communications network, or any other suitable communications network.

Figure 2:
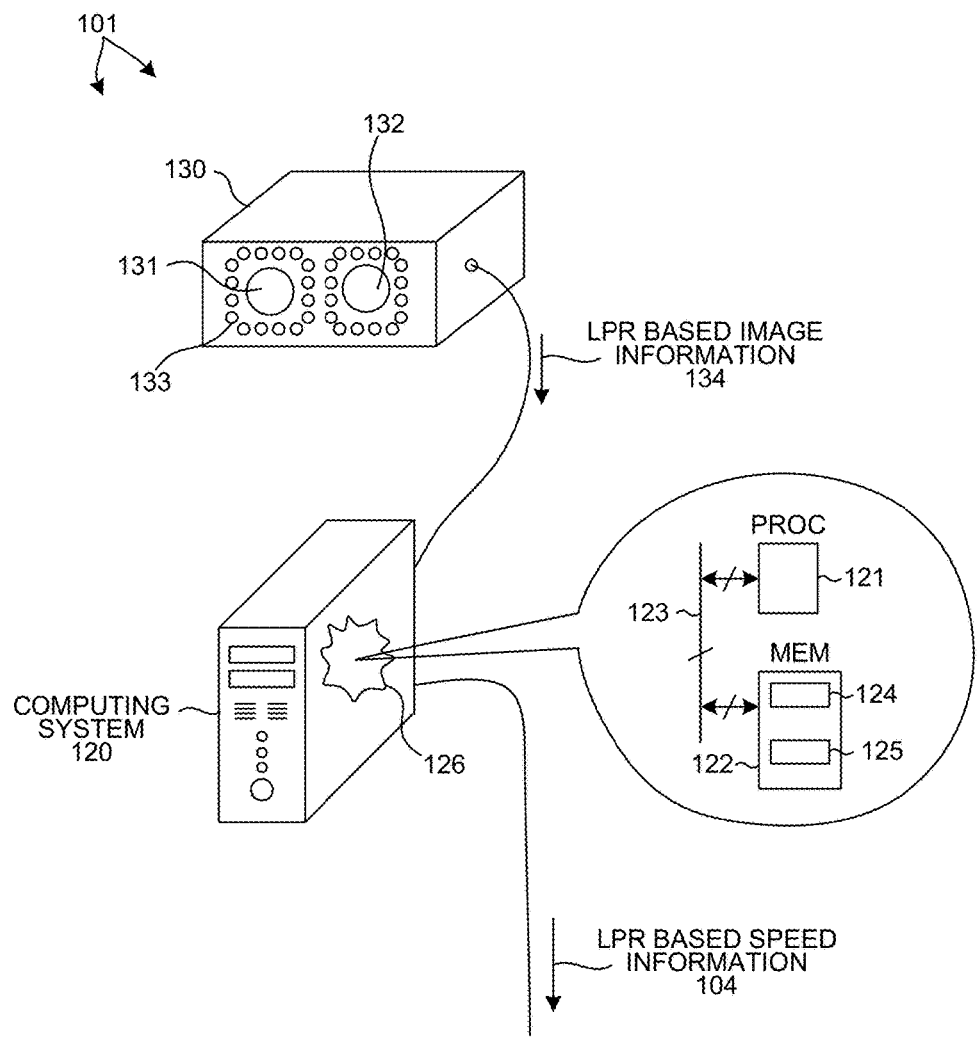
FIG. 2 is a diagram illustrative of a LPR imaging system 101 in one embodiment.

FIG. 2 depicts LPR imaging system 101 in one embodiment. As depicted in FIG. 2, LPR imaging system 101 includes a camera module 130 and a computing system 120 operable to implement tools useful to estimate the speed of passing vehicles. In the embodiment depicted in FIG. 2, camera module 130 includes a charge coupled device (CCD) sensor 131 and associated optics and an infrared (IR) sensor 132 and associated optics. The CCD sensor 131 is configured to capture color images over a field of view that includes the surface of roadway 110 depicted in FIG. 1.

Similarly, the IR sensor 132 is configured to capture IR images over a field of view that also includes the surface of roadway 110. In some embodiments, the fields of view of the IR sensor 132 and the CCD sensor 131 spatially overlap. Typically, the camera module 130 of an LPR imaging system 101 is configured with an IR sensor 132 and associated optics having a relatively narrow field of view to capture one or more images of the license plate of the passing vehicle with sufficient resolution to identify the license plate number. The CCD sensor 131 and associated optics are typically configured with a broader field of view to capture one or more images of a large portion, or the entirety, of the same passing vehicle. However, in general, the image sensors may have the same or different fields of view.

As depicted in the embodiment of FIG. 2, camera module 130 also includes one or more illumination sources 133 configured to provide illumination of passing vehicles to improve the quality of captured images. In some examples, the one or more illumination sources 133 are configured to generate light in the infrared band, visible band, or both. In some embodiments, the one or more illumination sources are light emitting diodes. In general, any suitable illumination source may be contemplated.

Computing system 120 of LPR imaging system 101 includes a processor 121 and a memory 122. Processor 121 and memory 122 may communicate over bus 123. Memory 122 includes an amount of memory 124 that stores LPR based image information 134 including a number of LPR images generated by camera module 130. Memory 122 also includes an amount of memory 125 that stores program code that, when executed by processor 121, causes processor 121 to implement vehicle speed estimation (VSE) functionality by operation of VSE tool 126.

For illustration purposes, camera module 130 and computing system 120 are depicted as separate mechanical units. However, in some embodiments, camera module 130 and computing system 120 are mechanically integrated into a single enclosure, or housing, to provide a more compact and lower cost package. It is understood that many other system and mechanical architectures may be contemplated within the scope of this patent document.

In one aspect, computing system 120 determines an estimate of vehicle speed at least in part by estimating the distance traversed by a passing vehicle during the time elapsed between image frames.

Figure 3:
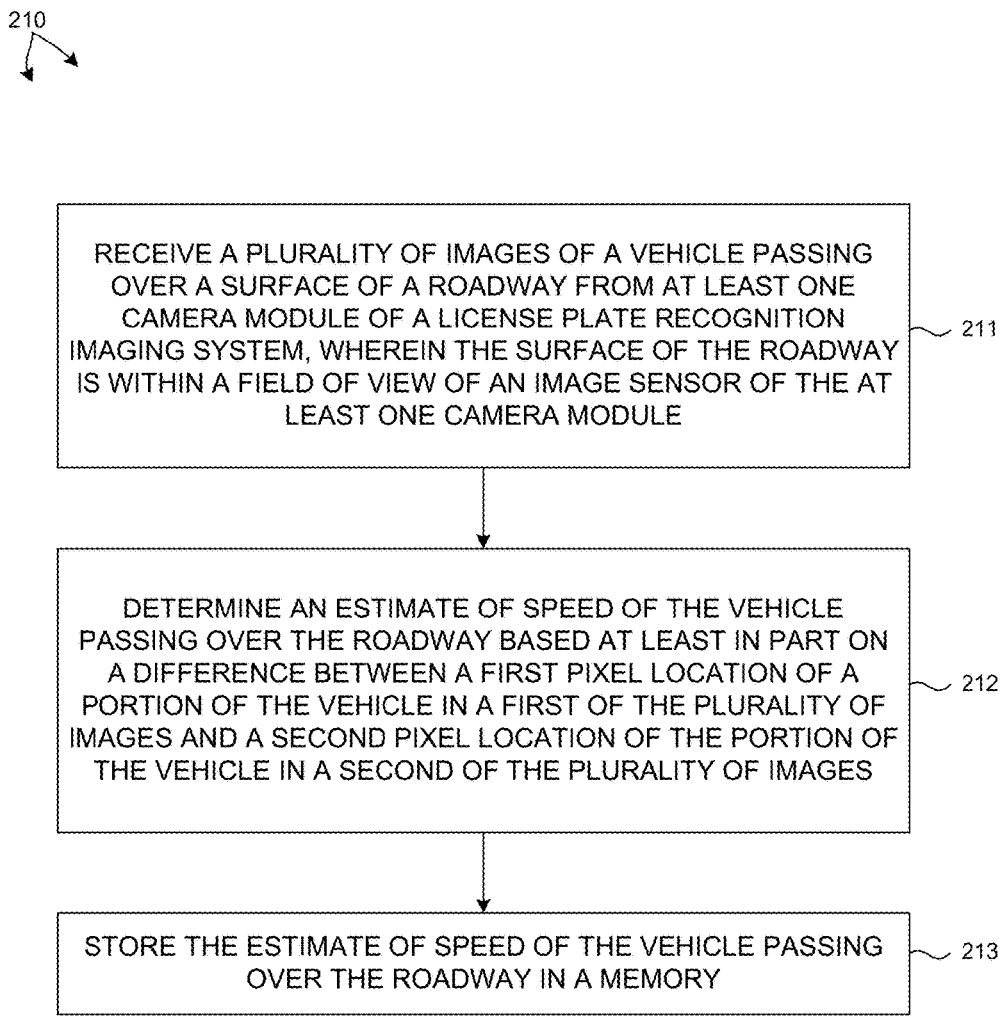
FIG. 3 is a flowchart illustrative of a method 210 of estimating the speed of a passing vehicle based on LPR based image information.

FIG. 3 illustrates a method 210 of estimating the speed of a passing vehicle based on LPR based image information. In one, non-limiting embodiment, computing system 120 implements vehicle speed estimation (VSE) functionality by operation of VSE tool 126 in accordance with method 210.

In block 211, computing system 120 receives a plurality of images of a vehicle passing over a surface of a roadway from the camera module 130 of LPR imaging system 101. As depicted in FIG. 2, computing system 120 receives LPR based image information 134 from camera module 130.

Figure 4:
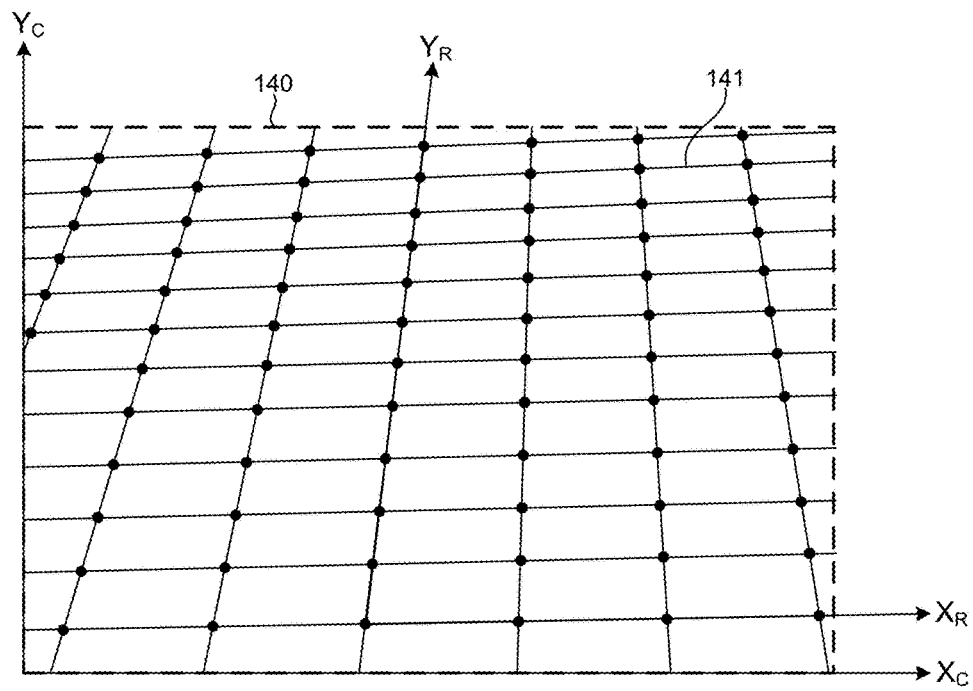
FIG. 4 is a diagram illustrative of a field of view 140 captured by a two dimensional sensor of camera module 130 of LPR imaging system 101.

As depicted in FIG. 1, the surface of the roadway is within the field of view of the image sensor (e.g., CCD sensor 131, IR sensor 132, etc.) of the camera module 130. FIG. 4 depicts a field of view 140 captured by a two dimensional sensor (e.g., CCD sensor 131) of camera module 130 of LPR imaging system 101. Field of view 140 includes a portion of the surface of roadway 110. During image capture, the roadway surface within field of view 140 is mapped onto a two dimensional array of pixels of the image sensor (e.g., IR sensor, CCD sensor, etc.). More specifically, locations on the roadway surface described by a two dimensional roadway coordinate set, $\{x_R, y_R\}$ are mapped onto locations on the surface of the image sensor described by a different, two dimensional camera coordinate set, $\{x_C, y_C\}$.

In one aspect, the estimating of vehicle speed involves a mapping between pixel locations of captured images and locations on the roadway surface to accurately estimate actual displacement of the vehicle on the roadway in the time between image frames based on the perceived displacement of the vehicle between the image frames themselves. There are several ways to establish this mapping.

In one example, depicted in FIG. 4, a tarp 141 having a set of evenly spaced gridlines (i.e., stripes) is placed on the surface of the roadway 110 within the field of view 140 of the camera module. An image of this tarp is captured by the camera module. The intersection points of gridlines running in the $x_R$ direction and gridlines running in the $y_R$ direction are directly mapped to the pixel locations where the intersection points appear in a captured image. In this manner, a discrete number of points in roadway coordinate space are directly mapped to a corresponding discrete number of points in camera coordinate space as illustrated in Equation (1).

$$\{x_C, y_C\}_i = \{x_R, y_R\}_i; \quad i=1:N \tag{1}$$

In this example, a discrete number of points on the roadway surface are directly related to a discrete number of pixel locations on the image sensor surface by analysis of the image of the calibration tarp 141 within the field of view of the image sensor. In a further example, any point in roadway coordinate space may be mapped to camera coordinate space by interpolation between adjacent, calibrated gridpoints, thus providing a point-to-point mapping, T, from the roadway coordinate space to the camera coordinate space as illustrated in Equation (2).

$$T = \{x_R, y_R\} \rightarrow \{x_C, y_C\} \tag{2}$$

In the aforementioned example, a mapping from the roadway surface to the image sensor surface is established based on analysis of an image of a calibration tarp. However, in general, the mapping may be generated by any number of techniques. For example, the mapping may be generated analytically based on the geometric layout of the image sensor, associated optics, and the roadway surface. In this manner, the point-to-point mapping, T, of Equation (2) may be generated by simulation. In yet another example, an analytical transformation from roadway coordinate space to camera coordinate space may be derived.

In block 212, computing system 120 determines an estimate of speed of the vehicle passing over the roadway. The estimate is based at least in part on a difference between a pixel location of a portion of the vehicle in a first image of the vehicle and a second pixel location of the same portion of the vehicle in second image of the vehicle.

In some embodiments, the estimate is based at least in part on a mapping between pixel locations within the field of view of the image sensor and locations on the surface of the roadway. More specifically, the speed estimation involves determining the distance traversed by the vehicle in camera coordinate space (e.g., difference in pixel location of a feature of the vehicle in two different images (e.g., two images captured successively), and mapping the distance traversed in camera coordinate space to the distance traversed in roadway coordinate space. Thus, computing system 120 is configured to track the motion of one or more features of a vehicle in a sequence of temporally spaced images captured from a single, fixed location. The tracking points associated with particular features captured in each image are mapped to corresponding locations on the roadway surface.

For example, as depicted in FIG. 1, LPR imaging system 101 is configured to identify the location of a license plate 107 of vehicle 106 at one moment in time, $T_1$, and identify the location of the same license plate 107 of the same vehicle 106 at a subsequent moment in time, $T_2$. Moreover, computing system 120 is configured to transform the pixel location of the license plate within each captured image to corresponding roadway locations, 108 and 109.

To estimate the distance traversed by a passing vehicle during the time elapsed between image frames, a mapping from camera coordinate space to roadway coordinate space is required. In some examples, the mapping of equation (2) is inverted to obtain the mapping from camera coordinate space to roadway coordinate space as illustrated in Equation (3).

$$T^{-1} = \{x_C, y_C\} \rightarrow \{x_R, y_R\} \quad (3)$$

Figure 5:
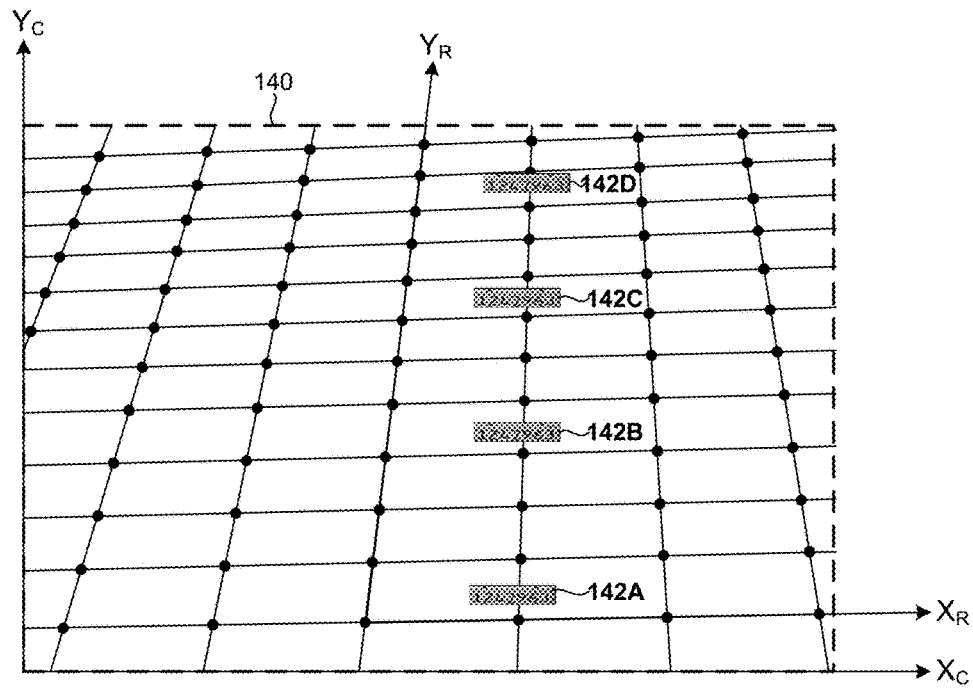
FIG. 5 is a diagram illustrative of the locations of images 142A-D of a license plate captured in four successive image frames within the field of view 140 of the camera module.

In one example, computing system 120 performs image analysis on each collected image to identify the license plate number associated with each image. FIG. 5 depicts the locations of images 142A-D of a license plate captured in four successive image frames within the field of view 140 of the camera module. In some examples, a tracking point associated with each license plate image in camera coordinate space is directly identified. In the example depicted in FIG. 5, the middle of the bottom edge of the image of the license plate is selected as the tracking point. As illustrated in Equation (4), the pixel location of the tracking point in camera coordinate space can be mapped to a corresponding location on the roadway surface, for example, based on the inverse mapping function described in Equation (3).

$$\{x_R, y_R\}_i = T^{-1}\{x_C, y_C\}_i \quad (4)$$

The Euclidean distance between the locations of the tracking point associated with successive images as projected onto the roadway surface can be determined based on Equation (5).

$$L_P |_i^{i+1} = \sqrt{(x_{R,i+1} - x_{R,i})^2 + (y_{R,i+1} - y_{R,i})^2} \quad (5)$$

By way of example, the distance, $L_P$, between projected points 108 and 109 is illustrated in FIG. 1. In general, the distance, $L_P$, may be used as an estimate of the distance traversed by a vehicle during the time elapsed between the capture of two images (e.g., $T_2 - T_1$).

However, in a further aspect, the estimate of the distance traversed by a vehicle between image frames is improved by accounting for the difference in height of the camera module and the location point of the vehicle being tracked over the roadway surface. In one example, the distance, $L_P$, between the projected locations 108 and 109 of the license plate is corrected in accordance with equation (6), $$L_V = L_P \frac{H_C - H_P}{H_C} \quad (6)$$

where $H_C$ is the distance between the image sensor and the roadway surface, and $H_P$ is the distance between the tracking point and the roadway surface. In this manner, the corrected estimate of the distance traversed by the vehicle, $L_V$, is employed to estimate vehicle speed.

In some other embodiments, the estimate of the distance traversed by a passing vehicle during the time elapsed between image frames involves a look-up table or function that relates movements in camera coordinate space (i.e., an image based coordinate system) to physical movements over the surface of the roadway.

Figure 11:
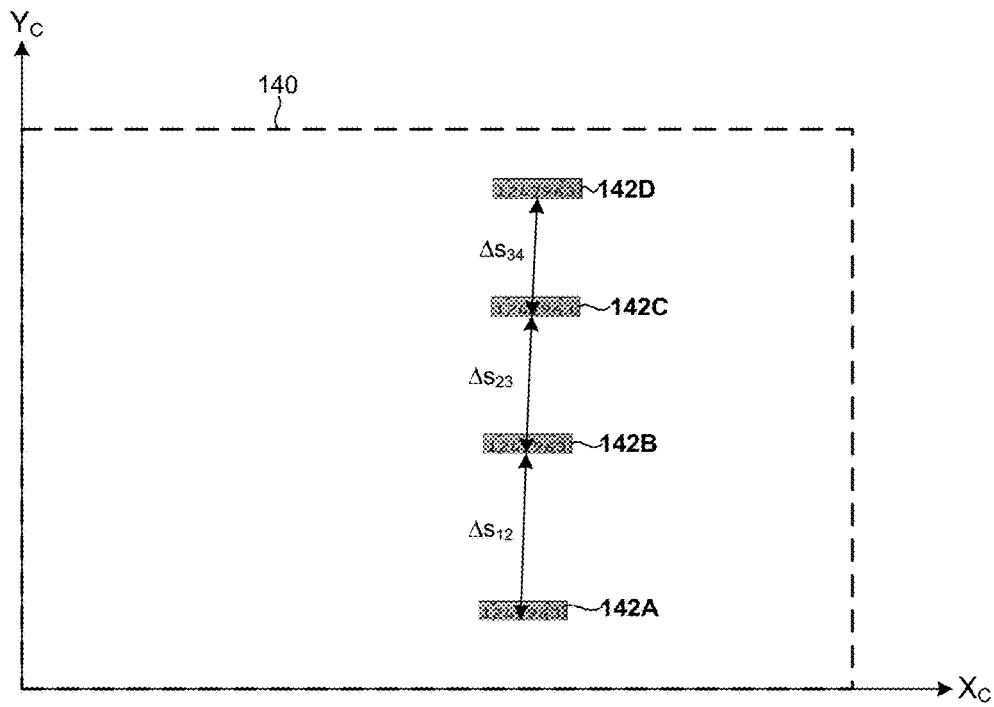
FIG. 11 illustrates the four consecutive images (i.e., 142A-D) of a license plate attached to a passing vehicle depicted in FIG. 5 and measured displacements between images of the license plate passing through camera coordinate space.

FIG. 11 illustrates the four consecutive images (i.e., 142A-D) of a license plate attached to a passing vehicle depicted in FIG. 5. The four successive image frames are captured at a constant frame rate (e.g., 30 frames/second). A tracking point is identified at the middle of the bottom of a license plate in each image, and a displacement, •s, in camera coordinate space (e.g., displacement in pixels) between each image frame can be calculated. For example, the displacement in pixels of the tracking point between image 142A and 142B is •$s_{12}$. Similarly, the displacement in pixels of the tracking point between image 142A and 142D is $\Delta s_{14}$.

Figure 12:
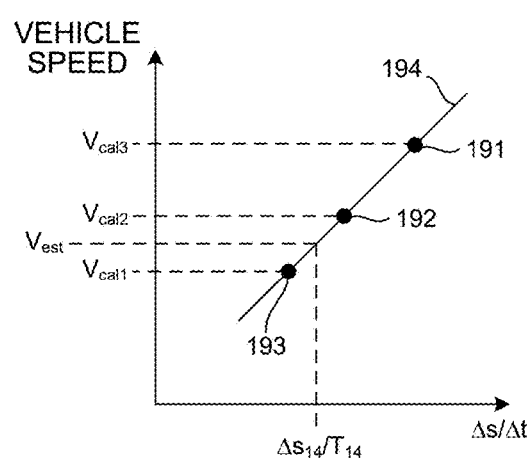
FIG. 12 illustrates a plot indicating a functional relationship between vehicle speed and the displacement in camera coordinate space between two images of the vehicle during the time elapsed between the two images.

FIG. 12 illustrates a plot indicating a functional relationship between vehicle speed and the displacement in camera coordinate space (e.g., displacement in pixels) between two images of the vehicle during the time elapsed between the two images. The relationship between movements in camera coordinate space and physical movements over the surface of the roadway is established based on a series of constant speed calibration passes. For example, as depicted in FIG. 12, three calibration passes, each at a different, known, constant speed (i.e., $V_{cal1}$, $V_{cal2}$, and $V_{cal3}$) are conducted. For each of these passes, the displacement, •s, in camera coordinate space between two images of the vehicle during the time elapsed, •t, between the two images is calculated. For example, data point 191 corresponds to the calibration pass at $V_{cal3}$, data point 192 corresponds to the calibration pass at $V_{cal2}$, and data point 193 corresponds to the calibration pass at $V_{cal1}$. Based on these results, a functional relationship illustrated by plotline 194 is established that relates the velocity of the vehicle to the velocity of the vehicle passing through camera coordinate space. The relationship between physical vehicle speed and vehicle speed passing through camera coordinate space can take the form of a mathematical function or a look-up table by way on non-limiting example. After establishing the relationship between actual vehicle speed and "pixel" speed, an estimate of vehicle speed can be determined based on a measured displacement between two images in camera coordinate space (e.g., •$s_{14}$) during the time elapsed, (e.g., $T_{14}$) between the capture of the two images.

In a further aspect, a correction is made to the difference in pixel locations of a tracking point attached to images of a passing vehicle in two different image frames. The correction accounts for the distortion induced by attempting to capture the movement of a vehicle in three dimensional space by a two dimensional image sensor at a fixed location.

Figure 13:
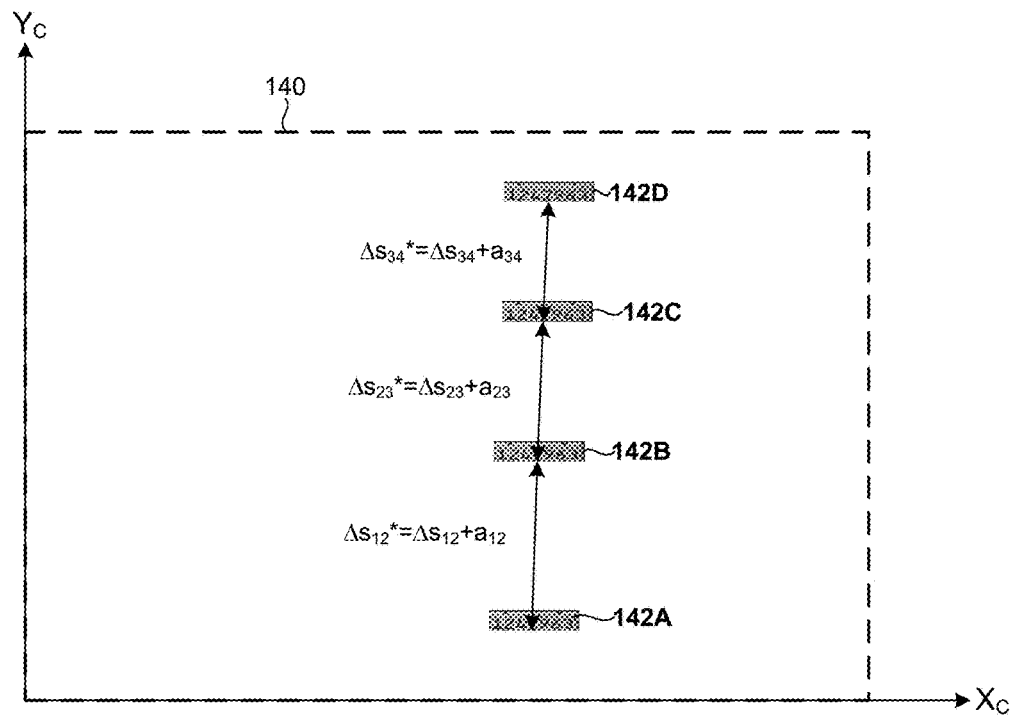
FIG. 13 illustrates the four consecutive images (i.e., 142A-D) of a license plate attached to a passing vehicle depicted in FIG. 5 and corrected displacements between images of the license plate passing through camera coordinate space.

FIG. 13 illustrates the four consecutive images (i.e., 142A-D) of a license plate attached to a passing vehicle depicted in FIG. 5. The four successive image frames are captured at a constant frame rate (e.g., 30 frames/second). A tracking point is identified at the middle of the bottom of a license plate in each image, and a displacement, $\Delta s$, in camera coordinate space (e.g., displacement in pixels) between each image frame can be calculated. For example, the displacement in pixels of the tracking point between image 142A and 142B is $\Delta s_{12}$. However, in addition, a corrected displacement $\Delta s^*$, in camera coordinate space is also calculated based on the measured displacement, $\Delta s$, in camera coordinate space and a constant valued correction factor, a. For example, the corrected displacement in pixels of the tracking point between image 142A and 142B is $\Delta s_{12}$, and corrected displacement is calculated by adding the correction factor, $a_{12}$, to the measured displacement, $\Delta s_{12}$.

Figure 14:
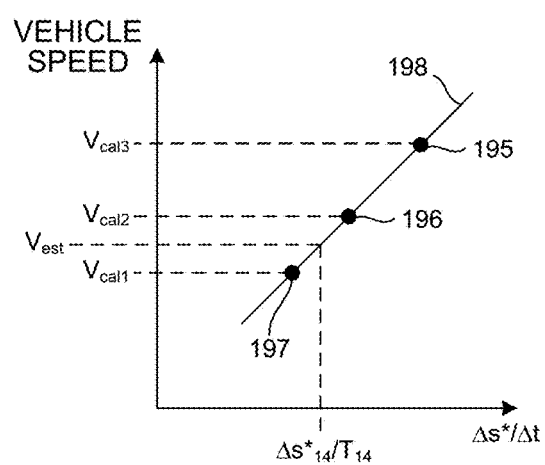
FIG. 14 illustrates a plot indicating a functional relationship between vehicle speed and the corrected displacement in camera coordinate space between two images of the vehicle during the time elapsed between the two images.

FIG. 14 illustrates a plot indicating a functional relationship between vehicle speed and the corrected displacement in camera coordinate space between two images of the vehicle during the time elapsed between the two images. As described hereinbefore, the relationship between movements in camera coordinate space and physical movements over the surface of the roadway is established based on a series of constant speed calibration passes. For example, as depicted in FIG. 14, three calibration passes, each at a different, known, constant speed (i.e., $V_{cal1}$, $V_{cal2}$, and $V_{cal3}$) are conducted. For each of these passes, the corrected displacement, $\Delta s^*$, in camera coordinate space between two images of the vehicle during the time elapsed, $\Delta t$, between the two images is calculated. For example, data point 191 corresponds to the calibration pass at $V_{cal3}$, data point 192 corresponds to the calibration pass at $V_{cal2}$, and data point 193 corresponds to the calibration pass at $V_{cal1}$. The calculations are performed by treating the correction factors as unknown constants, while enforcing the constraint that each of the corrected displacements between successive frames are equal (i.e., $\Delta s_{12}^* = \Delta s_{23}^* = \Delta s_{34}^*$). In this manner, correction factors are determined that result in corrected displacements between images that are the same value for a vehicle passing through with constant velocity.

Based on these results, a functional relationship illustrated by plotline 198 is established that relates the velocity of the vehicle to the velocity of the vehicle passing through camera coordinate space. After establishing the relationship between actual vehicle speed and corrected "pixel" speed, an estimate of vehicle speed can be determined based on a corrected displacement between two images in camera coordinate space (e.g., $\Delta s_{14}^*$) during the time elapsed, (e.g., $T_{14}$) between the capture of the two images.

In yet another further aspect, the estimate of vehicle speed is based on two or more estimates of the distance traversed by a vehicle between three or more successive image frames. FIG. 5 illustrates four consecutive images (i.e., 142A-D) of a license plate attached to a passing vehicle. The four successive image frames are captured at a constant frame rate (e.g., 30 frames/second). A tracking point is identified at the middle of the bottom of a license plate in each image. The movement of the tracking point across the field of view of the camera can be analyzed as a proxy for the movement of the vehicle. In this manner, four snapshots of the tracking point moving through camera coordinate space are captured.

FIG. 6 depicts a table 150 illustrating the location, displacement, and speed estimation associated with the tracking point moving with the vehicle. In this example, the pixel locations corresponding with the tracking point in each image frame is identified in camera coordinate space (i.e., $\{x_c, y_c\}$). Each pixel location in camera coordinate space is transformed to a corresponding coordinate in roadway coordinate space (i.e., $\{x_R, y_R\}$) by an appropriate transformation as described, for example, by Equation (4). The distance traversed between image frames by the tracking point in roadway coordinate space is calculated in accordance with equation (5). Each distance is corrected in accordance to equation (6). Finally, the speed associated with the movement of the tracking point between frames is determined as the corrected displacement, $L_v$, divided by the period of time elapsed between frames (e.g., 1/30 seconds). In one example, the vehicle speed is estimated as an average of the incremental vehicle speeds, $S_v$, associated with the displacement between each pair of image frames.

In a further aspect, each of the incremental vehicle speeds is evaluated to determine whether a significant error has occurred. In these examples, suspicious incremental vehicle speed calculations are dropped from consideration, and the average speed is determined without including the erroneous values. In one example, each incremental vehicle speed calculation is compared to a predetermined value. If the difference between the incremental speed and the predetermined value exceeds a predetermined threshold, the incremental speed is discarded. In another example, an average speed is calculated using each of the incremental speed values. Each of the incremental speeds are compared to the average value. If the difference between any incremental speed and the average value exceeds a predetermined threshold value, the offending incremental speed is discarded. A revised average speed is determined based only on incremental speeds that are not discarded. In general, there should be very little difference among incremental speeds because a typical moving vehicle is not capable of abruptly changing speed within such a short period of time under consideration (e.g., less than 500 milliseconds). Thus, any number of data analysis techniques may be applied to identify outlying incremental speeds and remove them from participation in subsequent calculations of overall vehicle speed.

In block 213, the estimate of vehicle speed is stored in a memory. In one example, the estimate of vehicle speed is stored in memory 124 of computing system 120. In another example, the estimate of vehicle speed is communicated to LPR server 102 as part of LPR based speed information 104 and stored in LPR database 103.

In the aforementioned examples, the location of the middle of the lower edge of a license plate was used to consistently identify the location of the vehicle in the image. However, in general, the location of any consistently identifiable feature of the vehicle may be employed to determine the distance traversed by the vehicle in the time elapsed between frames.

For example, FIG. 7A illustrates an image of a passing vehicle from an elevated viewpoint. FIG. 7B depicts the same image with a tracking point identified as the point at the front of the car that is furthest forward (i.e., point with the largest $y_c$ coordinate value). Such features (e.g., vehicle contours and edges) may be appropriate during daytime when ambient illumination is significant. In another example, FIG. 8A illustrates an image of the back of a passing vehicle from an elevated viewpoint. FIG. 8B depicts the same image with a tracking point identified as the middle of the top edge of the right-most taillight. Such features (e.g., light sources) may be appropriate during nighttime when ambient illumination is minimal.

In yet another further aspect, one or more different cameras may be positioned to track vehicle movement and estimate vehicle speed in accordance with the methods and systems described herein. In some examples, an IR camera is employed to focus on license plates. Tracking points may be identified in the images captured by the IR camera (e.g., license plate images depicted in FIG. 5) and vehicle speed estimated based on the IR images. In some examples, a CCD camera is employed to capture images of a large portion of a passing vehicle (i.e., less tightly focused than the IR camera) to facilitate vehicle identification. Tracking points may be identified in the images captured by the CCD camera (e.g., the leading point of the front of the car, a tailamp, etc.), and vehicle speed estimated based on the CCD images.

As illustrated in the embodiment depicted in FIG. 2, the CCD camera and the IR camera are located close together (e.g., adjacent to one another) as part of an integrated LPR imaging system 101. In one example, an estimate of vehicle speed is made based on analysis of images captured by the IR camera and another estimate of the speed of the same vehicle is made based on analysis of images captured by the CCD camera. In some examples, both estimates are combined (e.g., averaged) to determine a single estimate of vehicle speed. In some examples, the estimate of vehicle speed is based on an estimate derived from one camera or the other. For example, if the images acquired by the CCD camera are not usable for speed estimation, the estimation of vehicle speed is based on analysis of IR images only, or vice-versa.

In yet another aspect, the LPR system stores a record of each license plate number identified, the speed estimate of the passing vehicle, and the time and location associated with each speed estimate as an LPR instance in LPR database 103 stored on LPR server 102.

Figure 9:
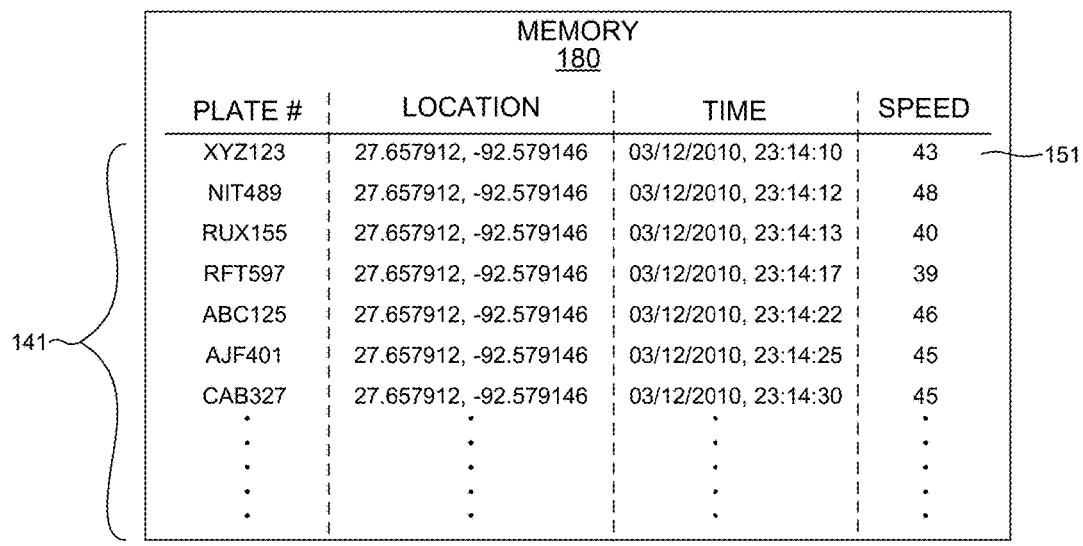
FIG. 9 is a diagram illustrative of a plurality of LPR instances 141 stored in memory 180.

FIG. 9 is illustrative of a plurality of LPR instances 141 stored in memory 180. An LPR instance includes an indication of the particular vehicle license plate number recognized by the LPR system at a particular location and time, and an estimate of speed of the vehicle associated with the license plate number. In the example illustrated in FIG. 2, LPR instances 141 each record an indication of the recognized vehicle license plate number, an indication of the location where the plate was recognized, an indication of the time that the plate was recognized, and an indication of vehicle speed. In other examples, additional information may be stored with any LPR instance. For example, an index identifier may be associated with each LPR instance. The index identifier may be useful to facilitate sorting and organizing the plurality of LPR instances. In another example, an amount of image data indicating a visual image of the vehicle that includes the vehicle license plate may be associated with each LPR instance. This may be useful to allow a human to visually confirm the license plate number recognized by the LPR system. In another example, an identifier of the address at the location of the LPR instance may be appended to an LPR instance. As illustrated in FIG. 9, LPR instance 151 indicates that a license date number "XYZ123" was recognized by the LPR system at the location given by GPS coordinates "27.657912, −92.579146" at 23:14:10 on Mar. 12, 2010. The speed of the vehicle associated with this LPR instance is estimated to be 43 meters/second.

LPR database 103 is searchable, for example, based on a license plate number. In another example, LPR database 103 is searchable by location. In this manner, LPR instances associated with a particular location may be analyzed. In one example, LPR database 103 is searchable by location and periods of time. In this manner, a distribution of the speeds of the passing vehicles on a particular roadway over a particular time period may be generated. In yet another example, LPR database 103 is searchable by vehicle speed, for example, to identify locations and times when significant over speed may be occurring. In some embodiments, LPR database 103 is indexed for efficient search by tools available with commercially available database software packages (e.g., Oracle®, Microsoft SQL Server®, IBM DB2®, etc.). In this manner, LPR database 103 is configured to be efficiently searched by the desired license plate numbers, locations, times, speeds, etc., communicated by an LPR information query. An LPR information query may be any format known to those skilled in the art (e.g., HTML script, PERL script, XML script, etc.).

As discussed above, any of the methods described herein may be executed by VSE tool 126 running within computing system 120. An operator may interact with VSE tool 126 via a locally delivered user interface (e.g., GUI displayed by terminal equipment directly connected to computing system 120). In other embodiments, an operator may interact with VSE tool 126 via a web interface communicated over a network (e.g., Internet, local area network, etc.).

Figure 10:
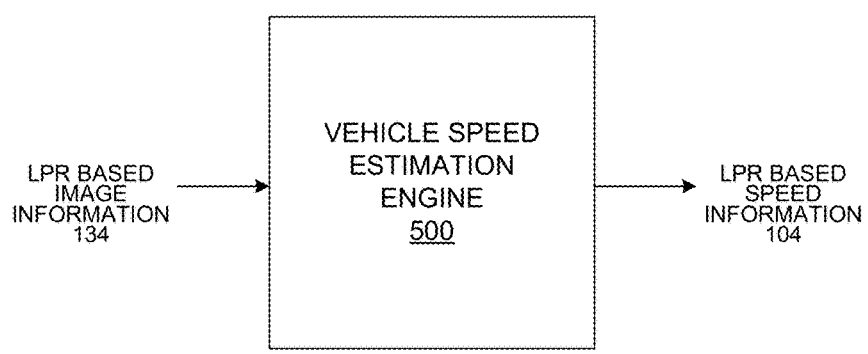
FIG. 10 is a simplified diagram illustrative of a vehicle speed estimation engine 500 configured to implement vehicle speed estimation functionality as described herein.

Although, the methods described herein may be executed by VSE tool 126 running within computing system 120, it may also be executed by dedicated hardware. FIG. 10 illustrates a vehicle speed estimation engine 500 configured to implement VSE functionality as discussed herein. In one example, vehicle speed estimation engine 500 receives LPR based image information 134 as input. Vehicle speed estimation engine 500 implements VSE functionality as discussed herein and generates LRP based speed information 104 based on the estimate of speed of each passing vehicle.

Any of the methods described herein may involve communicating LPR based speed information to an entity via a data file. The data file may be in electronic form (e.g., spreadsheet file, text file, graphics file, etc.) that indicates the vehicle speed estimations to a user viewing the file. In addition, any of the methods described herein may each involve receiving instructions from an entity. The instructions may be in electronic form (e.g., batch file, response to query, command input, etc.).

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   receiving a plurality of images of a vehicle passing over a surface of a roadway from at least one camera module of a license plate recognition imaging system, wherein the surface of the roadway is within a field of view of an image sensor of the at least one camera module;
   determining an estimate of speed of the vehicle passing over the roadway based at least in part on a difference between a first pixel location of a portion of the vehicle in a first of the plurality of images and a second pixel location of the portion of the vehicle in a second of the plurality of images, wherein the determining the estimate of speed of the vehicle involves a correction to the difference between the first pixel location and the second pixel location based on a plurality of passes of a vehicle through the field of view of the image sensor, each pass of the vehicle at a constant, known speed; and
   storing the estimate of speed of the vehicle in a memory.

2. The method of claim 1, wherein the determining the estimate of speed of the vehicle passing over the roadway is also based on a mapping between pixel locations within the field of view of the image sensor and locations on the surface of the roadway.

3. The method of claim 2, wherein the determining the estimate of speed of the vehicle involves determining a correction of the estimate of speed of the vehicle based at least in part on a distance between the surface of the roadway and the image sensor and a distance between the surface of the roadway and the portion of the vehicle.

4. The method of claim 2, further comprising:
   determining the mapping between pixel locations and locations on the surface of the roadway based at least in part on a calibration of a grid pattern located on the surface of the roadway is within the field of view of the image sensor to an image of the grid pattern generated by the image sensor.

5. The method of claim 4, wherein the calibration involves a mapping of locations on the grid pattern to pixel locations of the image of the grid pattern.

6. The method of claim 5, wherein the mapping involves interpolation between locations on the grid pattern and pixel locations of the image of the grid pattern.

7. The method of claim 1, wherein the portion of the vehicle includes any of a license plate, a taillight, and a bumper.

8. The method of claim 1, wherein the determining of the estimate of speed of the vehicle involves three of more images of the vehicle passing over the roadway.

9. The method of claim 8, wherein the determining of the estimate of speed of the vehicle involves discarding an estimate of speed of the vehicle based on two of the three or more images of the vehicle passing over the roadway.

10. The method of claim 1, further comprising:
    determining a distribution of vehicle speeds over the surface of the roadway based at least in part on the estimate of speed of the vehicle.

11. The method of claim 1, wherein the plurality of images of the vehicle includes color images or infrared images.

12. An apparatus comprising:
    a processor; and
    a memory storing an amount of program code that, when executed, causes the apparatus to
    receive a plurality of images of a vehicle passing over a surface of a roadway from at least one camera module of a license plate recognition imaging system, wherein the surface of the roadway is within a field of view of an image sensor of the at least one camera module;
    determine an estimate of speed of the vehicle passing over the roadway based at least in part on a difference between a first pixel location of a portion of the vehicle in a first of the plurality of images and a second pixel location of the portion of the vehicle in a second of the plurality of images, wherein the determining the estimate of speed of the vehicle involves determining a correction of the estimate of speed of the vehicle based at least in part on a distance between the surface of the roadway and the image sensor and a distance between the surface of the roadway and the portion of the vehicle; and
    store the estimate of speed of the vehicle in a memory.

13. The apparatus of claim 12, wherein the determining the estimate of speed of the vehicle involves a correction to the difference between the first pixel location and the second pixel location.

14. The apparatus of claim 13, the memory also storing an amount of program code that, when executed, causes the apparatus to:
    determine the correction to the difference between the first pixel location and the second pixel location based on a plurality of passes of a vehicle through the field of view of the image sensor, each pass of the vehicle at a constant, known speed.

15. The apparatus of claim 12, the memory also storing an amount of program code that, when executed, causes the apparatus to:
    determine a mapping between pixel locations and locations on the surface of the roadway based at least in part on a calibration of a grid pattern located on the surface of the roadway within the field of view of the image sensor to an image of the grid pattern generated by the image sensor.

16. The apparatus of claim 15, wherein the calibration involves a mapping of locations on the grid pattern to pixel locations of the image of the grid pattern.

17. The apparatus of claim 16, wherein the mapping involves interpolation between locations on the grid pattern and pixel locations of the image of the grid pattern.

18. The apparatus of claim 12, the memory also storing an amount of program code that, when executed, causes the apparatus to:
    determine a distribution of vehicle speeds over the surface of the roadway based at least in part on the estimate of speed of the vehicle.

19. A non-transitory, computer-readable medium, comprising:
    code for causing a computer to receive a plurality of images of a vehicle passing over a surface of a roadway from at least one camera module of a license plate recognition imaging system, wherein the surface of the roadway is within a field of view of an image sensor of the at least one camera module;
    code for causing the computer to determine an estimate of speed of the vehicle passing over the roadway based at least in part on a difference between a first pixel location of a portion of the vehicle in a first of the plurality of images and a second pixel location of the portion of the vehicle in a second of the plurality of images, wherein the determining the estimate of speed of the vehicle involves determining a correction of the estimate of speed of the vehicle based at least in part on a distance between the surface of the roadway and the image sensor and a distance between the surface of the roadway and the portion of the vehicle; and code for causing the computer to store the estimate of speed of the vehicle in a memory.

20. The non-transitory, computer-readable medium of claim 19, wherein the determining the estimate of speed of the vehicle passing over the roadway is also based on a mapping between pixel locations within the field of view of the image sensor and locations on the surface of the roadway.

21. The non-transitory, computer-readable medium of claim 20, further comprising:

code for causing the computer to determine the mapping between pixel locations and locations on the surface of the roadway based at least in part on a calibration of a grid pattern located on the surface of the roadway within the field of view of the image sensor to an image of the grid pattern generated by the image sensor.

\* \* \* \* \*